United States Patent
Ding et al.

(10) Patent No.: US 10,316,414 B2
(45) Date of Patent: Jun. 11, 2019

(54) REMOVING MATERIAL WITH NITRIC ACID AND HYDROGEN PEROXIDE SOLUTION

(71) Applicant: United Technologies Corporation, Farmington, CT (US)

(72) Inventors: Zhongfen Ding, South Windsor, CT (US); Mark R. Jaworowski, Glastonbury, CT (US)

(73) Assignee: United Technologies Corporation, Farmington, CT (US)

( * ) Notice: Subject to any disclaimer, the term of this patent is extended or adjusted under 35 U.S.C. 154(b) by 14 days.

(21) Appl. No.: 15/176,699

(22) Filed: Jun. 8, 2016

(65) Prior Publication Data

US 2017/0356092 A1    Dec. 14, 2017

(51) Int. Cl.
| | | |
|---|---|---|
| *C23F 1/28* | (2006.01) | |
| *C23G 1/10* | (2006.01) | |
| *F01D 5/00* | (2006.01) | |
| *F01D 5/28* | (2006.01) | |

(52) U.S. Cl.
CPC .............. *C23F 1/28* (2013.01); *C23G 1/10* (2013.01); *F01D 5/005* (2013.01); *F01D 5/288* (2013.01); *F05D 2220/32* (2013.01); *F05D 2230/10* (2013.01); *F05D 2300/177* (2013.01); *F05D 2300/21* (2013.01); *F05D 2300/228* (2013.01); *F05D 2300/229* (2013.01); *F05D 2300/608* (2013.01)

(58) Field of Classification Search
CPC ........ C23F 1/28; F01D 5/288; F05D 2220/32; F05D 2230/10; F05D 2300/21; F05D 2300/608; F05D 2300/228; F05D 2300/229; F05D 2300/177
See application file for complete search history.

(56) References Cited

U.S. PATENT DOCUMENTS

| | | | | |
|---|---|---|---|---|
| 3,931,030 A | * | 1/1976 | Ohno | ............... C23F 1/42 101/128.4 |
| 4,439,241 A | | 3/1984 | Ault et al. | |
| 4,707,191 A | * | 11/1987 | Martinou | ............... C23G 1/00 134/28 |

(Continued)

FOREIGN PATENT DOCUMENTS

| | | | |
|---|---|---|---|
| JP | 50-140333 A | * | 11/1975 |
| JP | S58110682 | | 7/1983 |

OTHER PUBLICATIONS

Adebayo et al., "Leaching of Sphalerite with Hydrogen Peroxide and Nitric Acid Solutions", Journal of Minerals & Materials Characterization & Engineering, vol. 5, No. 2, pp. 167-177, 2006.

(Continued)

*Primary Examiner* — Anita K Alanko
(74) *Attorney, Agent, or Firm* — O'Shea Getz P.C.

(57) ABSTRACT

During a material removal method, a component is received that includes a component body and a coating on the component body. The component body includes metallic first material. The coating includes second material that is different from the first material. A solution is received that includes nitric acid and hydrogen peroxide. At least a portion of the coating is subjected to the solution in order to remove at least some of the second material from the component.

14 Claims, 3 Drawing Sheets

(56) References Cited

U.S. PATENT DOCUMENTS

| | | | |
|---|---|---|---|
| 4,746,369 A * | 5/1988 | Sullivan | C09K 13/06 |
| | | | 134/3 |
| 5,201,997 A | 4/1993 | Fishter et al. | |
| 5,248,381 A * | 9/1993 | Dunker | F01D 25/002 |
| | | | 134/3 |
| 5,413,648 A | 5/1995 | Salkeld et al. | |
| 5,523,169 A * | 6/1996 | Rafferty | B23K 35/0233 |
| | | | 428/551 |
| 5,685,917 A | 11/1997 | Sangeeta | |
| 5,707,453 A | 1/1998 | Shurman et al. | |
| 6,174,380 B1 | 1/2001 | Rosenzweig et al. | |
| 6,475,289 B2 | 11/2002 | Schilbe et al. | |
| 6,660,638 B1 * | 12/2003 | Wang | C09G 1/02 |
| | | | 257/E21.304 |
| 6,833,328 B1 * | 12/2004 | Kool | C23F 1/44 |
| | | | 134/13 |
| 6,878,215 B1 | 4/2005 | Zimmerman, Jr. | |
| 7,875,200 B2 * | 1/2011 | Velez | C23F 1/16 |
| | | | 216/108 |
| 8,377,324 B2 * | 2/2013 | Fairbourn | C23F 1/08 |
| | | | 134/2 |
| 2001/0008141 A1 * | 7/2001 | Lee | C23G 1/086 |
| | | | 134/3 |
| 2004/0069748 A1 * | 4/2004 | Kryzman | C25F 5/00 |
| | | | 216/90 |
| 2005/0161439 A1 | 7/2005 | Wustman et al. | |
| 2008/0035178 A1 * | 2/2008 | Jabado | B08B 3/04 |
| | | | 134/22.16 |
| 2009/0252987 A1 * | 10/2009 | Greene, Jr. | G01N 29/228 |
| | | | 428/678 |
| 2009/0302004 A1 * | 12/2009 | Manier | C23F 1/44 |
| | | | 216/95 |
| 2010/0015805 A1 * | 1/2010 | Mayer | C23F 1/02 |
| | | | 438/692 |
| 2010/0304573 A1 * | 12/2010 | Fluegge | C01B 15/037 |
| | | | 438/754 |
| 2011/0112002 A1 | 5/2011 | Hudson et al. | |
| 2011/0120972 A1 * | 5/2011 | Faulkner | G01N 21/91 |
| | | | 216/57 |
| 2015/0114437 A1 | 4/2015 | Stewart | |
| 2016/0068968 A1 * | 3/2016 | Stratton | B32B 15/013 |
| | | | 428/678 |

OTHER PUBLICATIONS

Extended EP Search Report for EP Appln. No. 17174966.6 dated Nov. 2, 2017.

* cited by examiner

REMOVING MATERIAL WITH NITRIC ACID AND HYDROGEN PEROXIDE SOLUTION

BACKGROUND OF THE INVENTION

1. Technical Field

This disclosure relates generally to a method for chemically removing material coating a component.

2. Background Information

A typical nickel super alloy with a single crystal microstructure has a high temperature strength, toughness and resistance to corrosive and/or oxidative environment. Such an alloy therefore may be used to construct components, for example turbine blades, that are subject to hot and corrosive environments during use. However, forming a component from a nickel super alloy with a single crystal microstructure is time consuming and expensive. There is a need in the art therefore for methods to refurbish such a component and thereby extend its service life after that component has been exposed to a hot and corrosive environment.

SUMMARY OF THE DISCLOSURE

According to an aspect of the present disclosure, a material removal method is provided. During this method, a component is received that includes a component body and a coating on the component body. The component body includes metallic first material. The coating includes second material that is different from the first material.

According to another aspect of the present disclosure, a method is provided involving a component of a gas turbine engine. During this method, the component is received. The component includes a component body and a coating on the component body. The component body includes a nickel and/or cobalt alloy. The coating includes material that is a byproduct of corrosion of the component body. A solution is received that includes nitric acid and hydrogen peroxide. At least a portion of the coating is subjected to the solution in order to remove at least some of the material from the component.

The solution may substantially be non-reactive with the first material.

The solution may include between about 5-40 percent by volume of the nitric acid. The solution may also or alternatively include between about 5-25 percent by volume of the hydrogen peroxide.

The solution may include one or more complexing agents. The one or more complexing agents may include at least one of ammonia, organic amine, organic acid, inorganic acid and/or halide.

The second material may be or include a byproduct of corrosion of the first material.

The second material may be or include scales of oxide, nitride, salt and/or sulfide.

The first material may be or include a nickel alloy.

The first material may be or include a cobalt alloy.

The first material may have a single crystal microstructure.

The method may include a step of maintaining the solution at a temperature between about 0-100 degrees Celsius during the subjecting of the at least a portion of the coating to the solution.

The method may include a step of maintaining the solution at a temperature between about 10-60 degrees Celsius during the subjecting of the at least a portion of the coating to the solution.

The at least a portion of the coating may be subjected to the solution for a time period between about 30 minutes and about twenty-four hours.

The at least a portion of the coating may be subjected to the solution for a time period between about one hour and about three hours.

The at least a portion of the coating may be at an external surface of the component.

The at least a portion of the coating may be at an internal surface of the component.

The component may be configured as or include an airfoil of a gas turbine engine.

The foregoing features and the operation of the invention will become more apparent in light of the following description and the accompanying drawings.

DETAILED DESCRIPTION OF THE INVENTION

Methods are provided for removing material coated on a component. This component may be configured for an item of rotational equipment. The component, for example, may be configured as or include an airfoil. Examples of such a component include, but are not limited to, a fan blade, a guide vane and a propeller. In another example, the component may be configured as a panel or other component of a gas path wall. The methods of the present disclosure, however, are not limited to the foregoing exemplary component configurations.

The item of rotational equipment may be a gas turbine engine. The gas turbine engine may be configured in an aircraft propulsion system. Alternatively, the gas turbine engine may be configured in an auxiliary power unit for the aircraft. The methods of the present disclosure, however, are not limited to such aircraft applications. In other embodiments, for example, the gas turbine engine may be configured as an industrial gas turbine engine in a power generation system. In still other embodiments, the item of rotational equipment may alternatively be configured as a wind turbine, a water turbine or any other item of rotational equipment which includes a component capable of being treated as described below.

Figure 1:
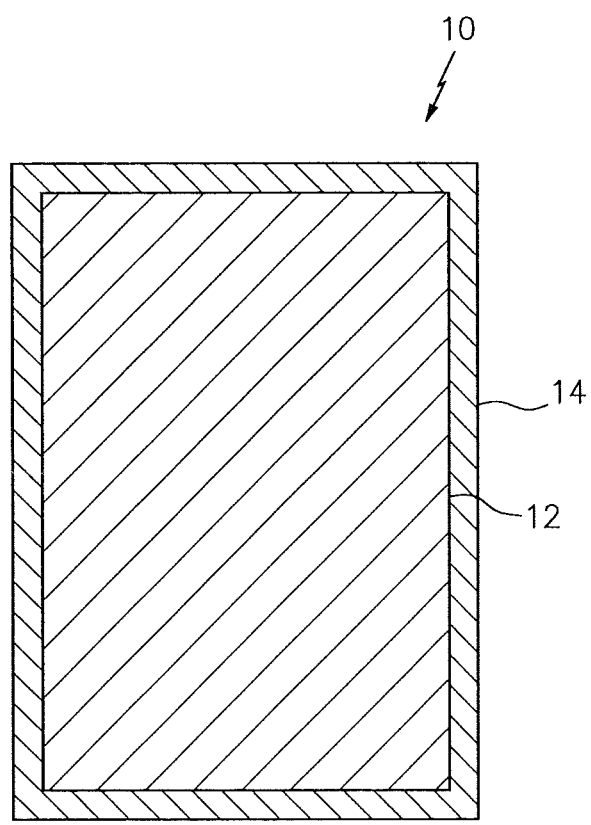
FIG. 1 is a schematic illustration of a component.

FIG. 1 is a block diagram illustration of a component 10 as described above. This component 10 includes a component body 12 (e.g., an airfoil body) and material 14 coated on the component body 12, which material is referred to below as "coating material".

The component body 12 of FIG. 1 is configured as a base of the component 10, and provides the component 10 with its structure and general geometry. The component body 12 is constructed (e.g., forged, cast, machined, additive manufactured, etc.) from metal. Examples of such metal include, but are not limited to, nickel (Ni), cobalt (Co), aluminum (Al), titanium (Ti) or an alloy of one or more of the foregoing materials. The component body 12, for example, may be formed from a nickel super alloy such as PWA1429 or PWA1440, which are tradenames of United Technologies Corporation of Hartford, Conn. In some embodiments, the component body 12 may be formed (e.g., cast and then cooled) such that the metal has a single crystal microstructure. The term "single crystal" may refer to a microstructure with a pattern of single crystal dendrites, where substantially all of the dendrites are solidified in a common crystallographic orientation. However, the present disclosure is not limited to any particular microstructures.

The coating material 14 may coat a portion or substantially all of the component body 12. The coating material 14 may be a byproduct of corrosion of the component body 12. For example, where the component 10 is an airfoil such as a turbine blade, the component body 12 may be subject to hot corrosion from deposition of environmental salts thereon during operation of the turbine engine. Such a hot corrosion process may subject the metal (e.g., Ni super alloy) of the component body 12 to repeated sulfidation, oxidation, nitridation, diffusion and/or other reactions. As a result of these reactions, layered oxide, nitride, salt and/or sulfide scales may be formed on the surface of the component body 12, and may make up the coating material 14. The coating material 14 of the present disclosure, however, is not limited to the foregoing exemplary coating materials or formation processes.

Figure 2:
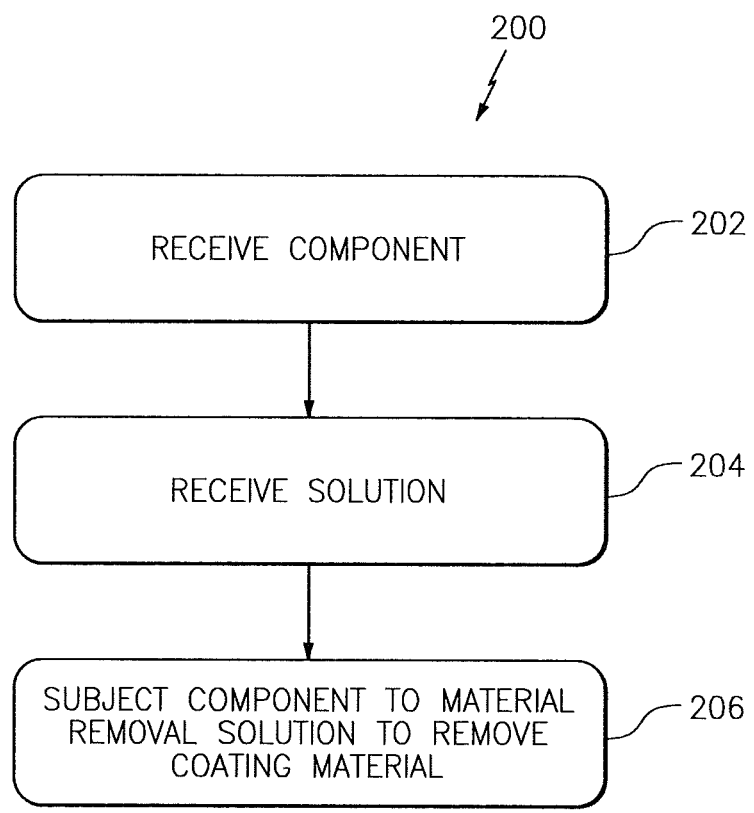
FIG. 2 is a flow diagram of a method for removing at least a portion of material coated on the component body of the component.

FIG. 2 is a flow diagram of a method 200 for removing at least a portion (or all) of the material coated on the component body 12. This method 200 is performed using a material removal solution 16.

The solution 16 includes a mixture of at least nitric acid and hydrogen peroxide. For example, the solution 16 may include between about 5-40 percent by volume of the nitric acid and between about 5-25 percent by volume of the hydrogen peroxide. The solution 16 may also include one or more other chemical components such as one or more complexing agents. Examples of complexing agents include, but are not limited to, ammonia, organic amine, organic acid, inorganic acid, and/or halide. In general, the chemical components of the solution 16 are selected and apportioned such that the solution 16 can remove the coating material 14 from the component body 12 without reacting with, removing or otherwise damaging the base material (e.g., metal) of the component body 12. The chemical components may also be selected to avoid carcinogenic chemicals, REACH chemicals, toxic chemicals such as, but not limited to, regulated hexavalent chromium and boron oxide compounds, etc. Exemplary solution 16 mixtures are listed below in Table 1. The present disclosure, however, is not limited to these exemplary mixtures.

An example solution 16 is made by mixing twenty percent by volume (20 vol %) of nitric acid, ten percent by volume (10 vol %) of hydrogen peroxide, with seventy percent by volume (70 vol %) of water at room temperature. Another example solution 16 is made by mixing fifteen percent by volume (15 vol %) of nitric acid, fifteen percent by volume (15 vol %) of hydrogen peroxide, with seventy percent by volume (70 vol %) of water at room temperature. Yet another example 16 may be made by mixing twenty percent by volume (20 vol %) of nitric acid, twenty percent by volume (20 vol %) of hydrogen peroxide, with sixty percent by volume (60 vol %) of water at room temperature.

TABLE 1

Exemplary solution 16 mixture compositions

| | Nitric acid vol % | Hydrogen Peroxide vol % | Water vol % |
|---|---|---|---|
| Example 1 | 20 | 10 | 70 |
| Example 2 | 15 | 15 | 70 |
| Example 3 | 20 | 20 | 60 |

In step 202, the component 10 is received. A component such as an airfoil, for example, may be received after that airfoil is removed from a gas turbine engine during maintenance or an overhaul.

In step 204, the solution 16 is received. The solution 16, for example, may be prepared offsite and then received. Alternatively, one or more components for the solution 16 may be received on site, and then the solution 16 may be prepared on site. This preparation may occur before performance of the method 200, or during this step 204.

Figure 3:
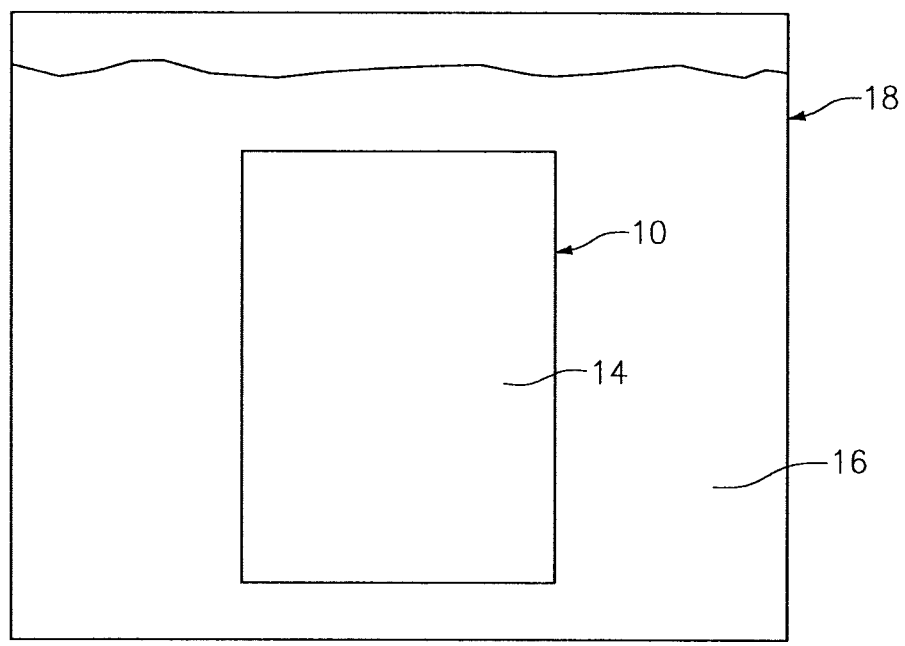
FIG. 3 is a schematic illustration of the component within a reservoir of a material removal solution.

In step 206, at least a portion of the coating is subjected to the solution 16 in order to remove at least some (or substantially all) of the coating material 14 from the component 10. For example, the component 10 may be disposed (e.g., submersed or otherwise immersed) within a reservoir/bath 18 of the solution 16 as shown in FIG. 3, where the solution 16 dissolves the coating material 14 in a steady digestive process.

During the step 206, the solution 16 may be maintained at a temperature between about zero degrees Celsius (0° C.) and about one-hundred degrees Celsius (100° C.) for a period of time between about thirty (30) minutes and about twenty-four (24) hours. For example, in some embodiments, the solution 16 may be maintained at a temperature between about ten degrees Celsius (10° C.) and about sixty degrees Celsius (60° C.) for a period of time between about one (1) hour and about three (3) hours. The method 200 of the present disclosure, however, is not limited to the foregoing exemplary temperature range or treatment period. In particular, the temperature range and/or treatment period may be altered depending on various parameters. Such parameters may include, but are not limited to, a thickness of the coating material 14 to be removed, a specific composition of the coating material 14, an allotted time period to remove the coating material 14, a composition of material beneath the coating material 14, etc.

In some embodiments, the component 10 may be fully immersed within the solution 16. In other embodiments, the component 10 may be partially immersed within the solution 16. In both of these embodiments, the solution 16 may be allowed to contact substantially all surfaces of the component 10, which may include internal and/or external surfaces. Alternatively, certain portion(s) of the component 10 may be masked or otherwise covered/blocked. In still other embodiments, rather than or in addition to immersing the component 10 within the solution 16, the solution 16 may be directed through one or more internal pathways (e.g., passages, cavities, etc.) within the component 10. The solution 16, for example, may be pumped through cooling pathways of an airfoil to remove the coating material 14 from those internal cooling pathways. In such embodiments, the solution 16 may be directed once through or alternatively re-circulated through the internal pathways. Directing the solution 16 once through the internal pathways exposes the coating material 14 to substantially pure solution, whereas recirculating the solution 16 through the internal pathways may expose the coating material 14 to a mixture of solution 16 and dissolved coating material 14 and/or other debris.

In some embodiments, the component body 12 may include one or more coating layers between the coating material 14 and the base material (e.g., metal) of the component body 12. For example, the base material may be coated with protective coating(s) such as, but not limited to, thermal barrier coating, hard coatings, environmental coating, etc. In such embodiments, the coating material 14 may accumulate on these other coating(s). The method 200 may also be performed to remove the coating material 14 in such embodiments.

In some embodiments, the method 200 may include one or more additional processing steps. For example, the component 10 may be treated with another solution before the coating removal described above. In another example, a top layer or bottom layer of the coating material 14 may be removed using another process; e.g., media blasting or otherwise. In still another example, after the coating material 14 is removed, the underlying component material may be coated with another material such as, but not limited to, a protective coating as described above.

While various embodiments of the present invention have been disclosed, it will be apparent to those of ordinary skill in the art that many more embodiments and implementations are possible within the scope of the invention. For example, the present invention as described herein includes several aspects and embodiments that include particular features. Although these features may be described individually, it is within the scope of the present invention that some or all of these features may be combined with any one of the aspects and remain within the scope of the invention. Accordingly, the present invention is not to be restricted except in light of the attached claims and their equivalents.

What is claimed is:

1. A material removal method, comprising:
    receiving a component that includes a component body and a coating on the component body, the component body comprising metallic first material, and the coating comprising second material that is different from the first material, wherein the component is a component of an item of rotational equipment;
    receiving a solution comprising nitric acid, hydrogen peroxide and one or more complexing agents; and
    subjecting at least a portion of the coating to the solution in order to remove at least some of the second material from the component, wherein a chemistry of the solution is selected such that the solution is substantially non-reactive with the first material;
    the subjecting comprising pumping the solution through an internal passage of the component;
    wherein the one or more complexing agents comprises ammonia.

2. The method of claim 1, wherein the second material comprises a byproduct of corrosion of the first material.

3. The method of claim 1, wherein
    the component is a component of a gas turbine engine; and
    the second material comprises scales of nitride, salt and/or sulfide.

4. The method of claim 1, wherein the first material comprises a nickel alloy.

5. The method of claim 1, wherein the first material comprises a cobalt alloy.

6. The method of claim 1, wherein the first material comprises a single crystal microstructure.

7. The method of claim 1, further comprising maintaining the solution at a temperature between about 0-100 degrees Celsius during the subjecting of the at least a portion of the coating to the solution.

8. The method of claim 1, wherein the at least a portion of the coating is subjected to the solution for a time period between about 30 minutes and about twenty four hours.

9. The method of claim 1, wherein the at least a portion of the coating is at an internal surface of the component.

10. The method of claim 1, wherein the item of rotational equipment comprises a gas turbine engine, and the component comprises an airfoil.

11. The method of claim 1, wherein the item of rotational equipment is a gas turbine engine.

12. The method of claim 1, wherein the subjecting comprises pumping the solution through an internal passage of the component.

13. The method of claim 1, wherein the solution comprises between ten and fifteen volume percent of the hydrogen peroxide.

14. The method of claim 1, wherein the solution comprises between about five and forty percent by volume of the nitric acid.

* * * * *